United States Patent
Kim et al.

(10) Patent No.: US 11,842,022 B2
(45) Date of Patent: Dec. 12, 2023

(54) ELECTRONIC DEVICE INCLUDING CAPACITIVE SENSOR DRIVEN BY STYLUS EXCITED BY MAGNETIC FIELD, TOUCH SYSTEM INCLUDING THE SAME, AND OPERATING METHOD THEREOF

(71) Applicant: Korea University Research and Business Foundation, Seoul (KR)

(72) Inventors: Chulwoo Kim, Seoul (KR); Soonsung Ahn, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/168,387

(22) Filed: Feb. 5, 2021

(65) Prior Publication Data
US 2022/0197443 A1    Jun. 23, 2022

(30) Foreign Application Priority Data

Dec. 23, 2020  (KR) .................. 10-2020-0182614
Jan. 15, 2021  (KR) .................. 10-2021-0006305

(51) Int. Cl.
*G06F 3/044*     (2006.01)
*G06F 3/041*     (2006.01)
(Continued)

(52) U.S. Cl.
CPC ........ *G06F 3/0447* (2019.05); *G06F 3/03545* (2013.01); *G06F 3/046* (2013.01);
(Continued)

(58) Field of Classification Search
CPC .. G06F 3/0447; G06F 3/03545; G06F 3/0412; G06F 3/0445; G06F 3/046;
(Continued)

(56) References Cited

U.S. PATENT DOCUMENTS 9,886,158 B2 *  2/2018  Wang ................. G06F 3/04164
11,269,441 B2   3/2022  Kim et al.
(Continued)

FOREIGN PATENT DOCUMENTS

| KR | 10-2014-0018017 A | 2/2014 |
| KR | 10-2015-0141067 A | 12/2015 |
| KR | 10-2020-0142343 A | 12/2020 |

*Primary Examiner* — Patrick N Edouard
*Assistant Examiner* — Joseph P Fox
(74) *Attorney, Agent, or Firm* — NSIP Law

(57) ABSTRACT

Disclosed is an electronic device, which includes a plurality of driving coils that are sequentially arranged in a first direction in a plan view, a plurality of sensing electrodes that are spaced and insulated from the plurality of driving coils and are sequentially arranged in a second direction orthogonal or pseudo-orthogonal to the first direction in a plan view, and a processor that is electrically connected with the plurality of driving coils and the plurality of sensing electrodes. At least one of the plurality of sensing electrodes is electrically coupled with a stylus excited by a magnetic field generated by the plurality of driving coils. The processor applies a driving signal to the plurality of driving coils, receives a response signal to the driving signal from the plurality of sensing electrodes, and identifies a contact location of the stylus based on the response signal.

14 Claims, 16 Drawing Sheets

(51) Int. Cl.
*G06F 3/0354* (2013.01)
*G06F 3/046* (2006.01)

(52) U.S. Cl.
CPC .......... *G06F 3/0412* (2013.01); *G06F 3/0445* (2019.05); *G06F 3/0446* (2019.05); *G06F 3/04162* (2019.05); *G06F 3/04166* (2019.05); *G06F 2203/04106* (2013.01)

(58) Field of Classification Search
CPC ............... G06F 3/04166; G06F 3/0446; G06F 2203/04106; G06F 3/04162
See application file for complete search history.

(56) References Cited

U.S. PATENT DOCUMENTS

| | | | |
|---|---|---|---|
| 2015/0070309 A1* | 3/2015 | Kang | G06F 3/0445 345/174 |
| 2015/0160782 A1* | 6/2015 | Park | G06F 3/0442 345/174 |
| 2017/0123569 A1* | 5/2017 | Kim | G06F 3/046 |
| 2018/0136762 A1* | 5/2018 | Jeong | G02F 1/133305 |

* cited by examiner

FIG. 11

| Items | [N]th Driving | | |
|---|---|---|---|
| | Trise | Tsteady | Tdecay |
| Posi-on | O | O | O |

| Items | [N]th Driving | | |
|---|---|---|---|
| | Trise | Tsteady | Tdecay |
| Posi-on | O | O | |

| Items | [N]th Driving | | |
|---|---|---|---|
| | Trise | Tsteady | Tdecay |
| Posi-on | | O | |

| Items | [N]th Driving | | |
|---|---|---|---|
| | Trise | Tsteady | Tdecay |
| Posi-on | | | O |

FIG. 12

| Items | [N]th Driving | | Pen-neighbor Tx Driving | | Additional Driving | |
|---|---|---|---|---|---|---|
| | Burst | Blank | Burst | Blank | Burst | Blank |
| Freq-on | | O | | | | |

| Items | [N]th Driving | | Pen-neighbor Tx Driving | | Additional Driving | |
|---|---|---|---|---|---|---|
| | Burst | Blank | Burst | Blank | Burst | Blank |
| Freq-on | | | | O | | |

| Items | [N]th Driving | | Pen-neighbor Tx Driving | | Additional Driving All Tx Driving | |
|---|---|---|---|---|---|---|
| | Burst | Blank | Burst | Blank | Burst | Blank |
| Freq-on | | | | | | O |

| Items | [N]th Driving | | Pen-neighbor Tx Driving | | Additional Driving Pen-neighbor Tx Driving | |
|---|---|---|---|---|---|---|
| | Burst | Blank | Burst | Blank | Burst | Blank |
| Freq-on | | | | | | O |

ELECTRONIC DEVICE INCLUDING CAPACITIVE SENSOR DRIVEN BY STYLUS EXCITED BY MAGNETIC FIELD, TOUCH SYSTEM INCLUDING THE SAME, AND OPERATING METHOD THEREOF

CROSS-REFERENCE TO RELATED APPLICATIONS

This application claims priority under 35 U.S.C. § 119 to Korean Patent Application No. 10-2020-0182614 filed on Dec. 23, 2020, and Korean Patent Application No. 10-2021-0006305 filed on Jan. 15, 2021 in the Korean Intellectual Property Office, the disclosures of which are incorporated by reference herein in their entireties.

BACKGROUND

The present disclosure relates to an electronic device including a capacitive sensor driven by a stylus excited by a magnetic field, a touch system including the electronic device, and an operating method thereof.

A digitizer is a sensor that senses a location, an angle, and a pressure of a stylus pen upon proximity, contact, or press of the stylus pen. The digitizer may replace a separate input device such as a keyboard or a mouse. In particular, the digitizer may be a sensor device that is useful to draw a sketch or take notes and thus is widely used in a mobile device and an electronic board.

The digitizer that is in the shape of a plate is attached on or integrated in various surfaces. In the case of a mobile device, the digitizer is attached to or integrated in a display panel that mainly displays an image. As the mobile device uses the digitizer as an auxiliary device of a touch sensor, the touch sensor and the digitizer are used independently of each other, or a digitizer function is added to a touch sensor device.

Meanwhile, in the case of adding the above stylus function to a flexible device (e.g., a foldable mobile phone), the flexibility and the portability of the stylus are important, but existing technologies fail to satisfy the flexibility and the portability at the same time.

SUMMARY

Various examples of the present disclosure are to provide an electronic device capable of improving portability of a stylus for driving while providing flexibility more improved than an existing digitizer, a touch system including the electronic device, and an operating method thereof.

The technical objects of the present disclosure will not be limited only to the objects described above, and other technical objects that have not been mentioned above may be considered by one skilled in the art from various examples of the present disclosure to be described below.

According to an aspect of the present disclosure, an electronic device includes a plurality of driving coils that are sequentially arranged in a first direction in a plan view, a plurality of sensing electrodes that are spaced and insulated from the plurality of driving coils and are sequentially arranged in a second direction orthogonal or pseudo-orthogonal to the first direction in a plan view, and a processor that is electrically connected with the plurality of driving coils and the plurality of sensing electrodes. At least one of the plurality of sensing electrodes is electrically coupled with a stylus excited by a magnetic field generated by the plurality of driving coils. The processor applies a driving signal to the plurality of driving coils, receives a response signal to the driving signal from the plurality of sensing electrodes, and identifies a contact location of the stylus based on the response signal.

For example, the plurality of sensing electrodes may be located on the plurality of driving coils.

For example, the electronic device may further include a display substrate including a display area.

For example, the display substrate may be interposed between the plurality of driving coils and the plurality of sensing electrodes.

For example, the electronic device may further include a cover film located on the plurality of sensing electrodes to be in contact with the stylus.

For example, the electronic device may further includes a plurality of driving electrodes that are spaced and insulated from the plurality of driving coils and the plurality of sensing electrodes and are sequentially arranged in the first direction in a plan view.

For example, at least one of the plurality of driving electrodes may be electrically coupled with not the stylus but an input means, and at least one of the plurality of driving electrodes may be electrically coupled with the input means.

For example, each of the plurality of driving coils may include at least one turn.

For example, the processor may apply the driving signal at a different time, and may identify at least one of a plurality of points at which at least one of the plurality of sensing electrodes corresponds to the plurality of driving coils, as a contact location, based on the different time.

For example, the processor may identify the contact location during a first timing of an interval where the response signal is received, and may identify a resonant frequency of the stylus during a second timing following the first timing and belonging to the interval.

For example, the first timing may be a time interval from when the response signal is received to when a steady state of the response signal ends.

According to another aspect of the present disclosure, a touch system includes a stylus, and an electronic device that identifies a contact location of the stylus. The electronic device includes a plurality of driving coils that are sequentially arranged in a first direction in a plan view, a plurality of sensing electrodes that are spaced and insulated from the plurality of driving coils and are sequentially arranged in a second direction orthogonal or pseudo-orthogonal to the first direction in a plan view, and a processor that is electrically connected with the plurality of driving coils and the plurality of sensing electrodes. The stylus is excited by a magnetic field generated by the plurality of driving coils, and at least one of the plurality of sensing electrodes is electrically coupled with the stylus. The processor applies a driving signal to the plurality of driving coils, receives a response signal to the driving signal from the plurality of sensing electrodes, and identifies the contact location of the stylus based on the response signal.

For example, the plurality of sensing electrodes may be located on the plurality of driving coils.

For example, the electronic device may further include a display substrate including a display area, and a cover film located on the plurality of sensing electrodes to be in contact with the stylus, and the display substrate may be interposed between the plurality of driving coils and the plurality of sensing electrodes.

For example, the electronic device may further include a plurality of driving electrodes spaced and insulated from the plurality of driving coils and the plurality of sensing electrodes and sequentially arranged in the first direction in a plan view.

For example, at least one of the plurality of driving electrodes may be electrically coupled with not the stylus but an input means, and at least one of the plurality of driving electrodes may be electrically coupled with the input means.

For example, the processor may apply the driving signal at a different time for each of the plurality of driving coils, and may identify at least one of a plurality of points at which at least one of the plurality of sensing electrodes corresponds to the plurality of driving coils, as a contact location, based on the different time.

For example, the processor may identify the contact location during a first timing of an interval where the response signal is received, and may identify a resonant frequency of the stylus during a second timing following the first timing and belonging to the interval, and the first timing may be a time interval from when the response signal is received to when a steady state of the response signal ends.

According to another aspect of the present disclosure, a method which is performed by an electronic device including a plurality of driving coils, a plurality of sensing electrodes, and a processor electrically connected with the plurality of driving coils and the plurality of sensing electrodes includes applying, at the processor, a driving signal to the plurality of driving coils, receiving, at the processor, a response signal to the driving signal from the plurality of sensing electrodes, and identifying, at the processor, a contact location of a stylus, which is excited by a magnetic field generated by the plurality of driving coils, based on the response signal, and the response signal is received based on that at least one of the plurality of sensing electrodes is electrically coupled with the stylus.

For example, the driving signal may be applied at a different time for each of the plurality of driving coils, and at least one of a plurality of points at which at least one of the plurality of sensing electrodes corresponds to the plurality of driving coils may be identified as the contact location, based on the different time.

For example, the contact location may be identified during a first timing of an interval where the response signal is received.

For example, the method may further include identifying, at the processor, a resonant frequency of the stylus during a second timing following the first timing and belonging to the interval.

Various examples of the present invention described above are merely a part of preferred examples of the present disclosure. Those skilled in the art will derive and understand various examples reflecting the technical features according to various examples of the present disclosure from the following detailed description.

BRIEF DESCRIPTION OF THE FIGURES

The accompanying drawings are to help the understanding of various examples of the present disclosure and provide various examples of the present disclosure together with the detailed description. However, technical features of various examples of the present disclosure are not limited to a specific drawing, and features disclosed in each drawing may be combined to form a new embodiment. In each drawing, reference numerals mean structural elements.

FIG. 11 is a diagram for describing a Posi-on timing according to an example of the present disclosure.

FIG. 12 is a diagram for describing a Freq-on timing according to an example of the present disclosure.

DETAILED DESCRIPTION

Although the terms "first", "second", etc. may be used herein in reference to various components, such components should not be construed as being limited by these terms. The above terms are only used to distinguish one element from another. For example, a first element could be termed a second element, and a second element could be termed a first element, without departing from the scope of the invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Expressions, which are used to describe relationships between elements, such as "between" versus "directly between," "adjacent" versus "directly adjacent," etc. should be interpreted in a like fashion.

In various examples of the present disclosure, "I" and "," should be interpreted as indicating "and/or". For example, "A/B" may mean "A and/or B". In addition, "A, B" may mean "A and/or B". Furthermore, "A/B/C" may mean "at least one of A, B, and/or C". Also, "A, B, C" may mean "at least one of A, B, and/or C".

In various examples of the present disclosure, "or" should be interpreted as indicating "and/or". For example, "A or B" may mean "only A", "only B", and/or "both A and B". In other words, "or" should be interpreted as indicating "additionally or alternatively".

The terminology used herein to describe examples of the present disclosure is not intended to limit the scope of the invention. The articles "a," "an," and "the" are singular in that they have a single referent, however, the use of the singular form in the present document should not preclude the presence of more than one referent. It will be further understood that the terms "comprises," "comprising," "includes," or "including," when used herein, specify the presence of stated features, items, steps, operations, elements, and/or components, but do not preclude the presence or addition of one or more other features, items, steps, operations, elements, components, and/or groups thereof.

Furthermore, unless otherwise defined, all terms including technical and scientific terms used herein are to be interpreted as is customary in the art to which this invention belongs. It will be further understood that terms in common usage should also be interpreted as is customary in the relevant art and not in an idealized or overly formal sense unless expressly so defined herein. Hereinafter, various examples of the present disclosure will be described in detail with reference to the accompanying drawings.

Electronic Device

Figure 1:
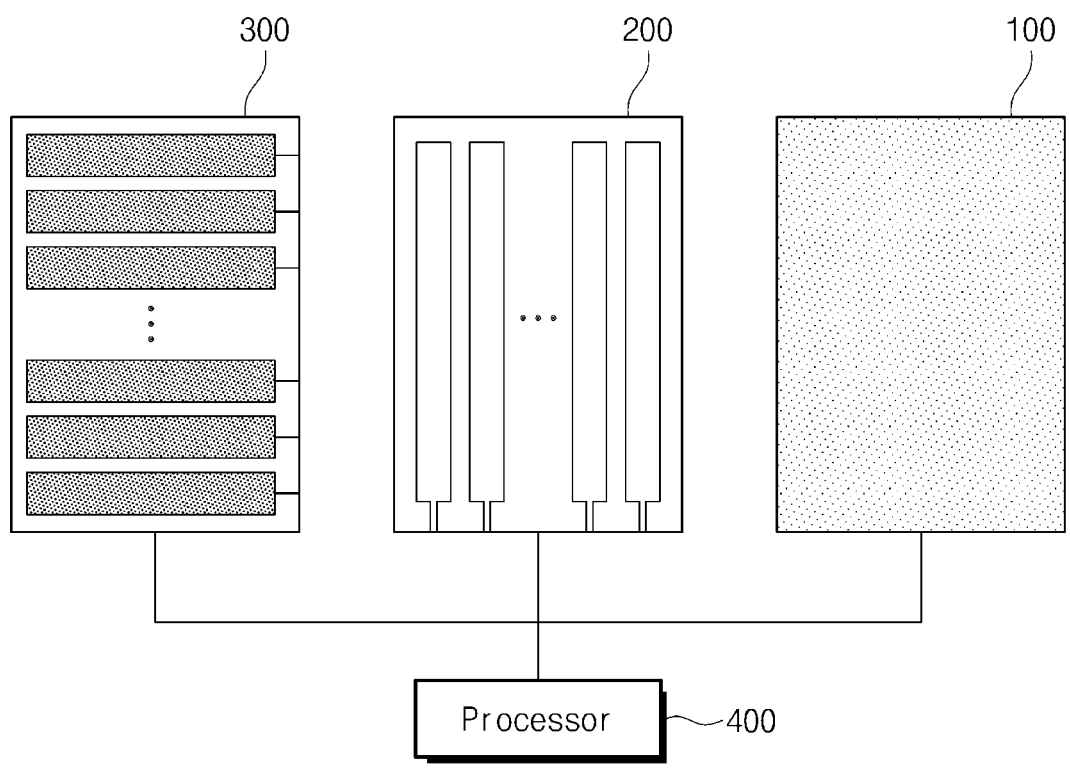
FIG. 1 is a diagram illustrating a configuration of an electronic device according to an example of the present disclosure.
Figure 2:
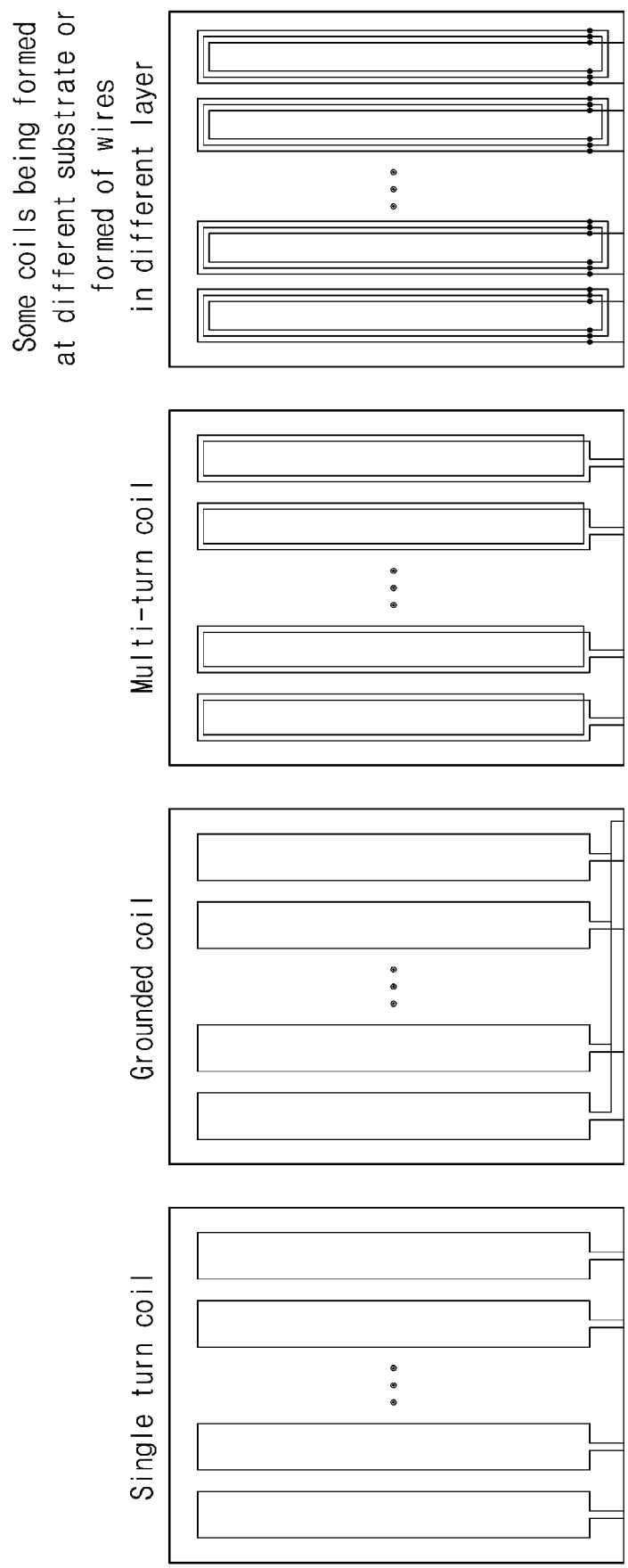
FIG. 2 illustrates various examples of a driving signal.

FIG. 1 is a diagram illustrating a configuration of an electronic device according to an example of the present disclosure, and FIG. 2 illustrates various examples of a driving coil.

Referring to FIG. 1, an electronic device according to an example of the present disclosure includes a display substrate 100, a driving coil 200, a sensing electrode 300, and a processor 400.

The display substrate 100 includes a display area, and a text, an image, a video, or the like is displayed by a display driver circuit (or a display driver integrated circuit) electrically connected with the display substrate 100.

The driving coil 200 includes two ends, which are opposite to each other. The driving coil 200 includes a plurality of driving coils that are sequentially arranged in a first direction in a plan view. The first direction may be a horizontal direction of FIG. 1, that is, an X-axis direction, but this is an example. In the present disclosure, the first direction is not limited to the horizontal direction.

The driving coil 200 may be electrically connected with a coil driving circuit such that a driving signal is applied thereto. Alternatively, the driving coil 200 may be electrically connected with a wire of the display substrate 100, a wire of a coil substrate (not illustrated) where the driving coil 200 is formed, and/or a wire of the processor 400.

For example, the driving coil 200 may have at least one turn. As illustrated in FIG. 2, the number of turns of the driving coil 200 may be 1 or may be 2 or more.

For example, a first end of the two ends of the driving coil 200 may be connected with a ground (GND).

For example, at least one of the two ends of the driving coil 200 may be connected with a layer different from a layer where the driving coil 200 is located.

The driving coil 200 may be provided on the display substrate 100. For example, the driving coil 200 may be provided on the top or the bottom of the display substrate or within the display substrate 100. In the case where the driving coil 200 is provided on the top of the display substrate 100, the driving coil 200 may be used as an electrode of the first direction.

The driving coil 200 may be formed at a separate coil substrate (not illustrated), not the display substrate 100. Here, the coil substrate (not illustrated) may be, for example, a printed circuit board (PCB) or a flexible printed circuit board (FPCB).

For example, the driving coil 200 may be formed at the coil substrate (not illustrated) by using a metal deposition, ink-jet printing, silkscreen, printing, or metal etching method. The coil substrate (not illustrated) may be provided, for example, on the top or the bottom of the display substrate 100.

The driving coil 200 may be provided in a single layer or may be provided in multiple layers by using metal layers, bridges, or via holes.

The sensing electrode 300 (or a capacitive sensor) may include a plurality of sensing electrodes, and the plurality of sensing electrodes 300 may be configured to perform sensing operations at different times. The sensing electrode 300 is spaced and insulated from the driving coil 200. For example, the sensing electrode 300 is located in a layer different from that of the driving coil 200 so as to be spaced from each other. Here, that the sensing electrode 300 is located in a different layer means that the sensing electrode 300 is located in a layer above the driving coil 200 or is located in a layer below the driving coil 200.

The plurality of sensing electrodes 300 are sequentially arranged in a second direction, which is orthogonal or pseudo-orthogonal to the first direction in which the driving coils 200 are arranged. The second direction may be a vertical direction of FIG. 1, that is, a Y-axis direction, but this is an example. In the present disclosure, the second direction is not limited to the vertical direction.

The sensing electrode 300 may be electrically coupled with a stylus that is excited by a magnetic field generated by the driving coil 200. In the present disclosure, the expression "electrically coupled" may mean that capacitive coupling is made between the sensing electrode 300 and an electrode included in the stylus.

The sensing electrode 300 may be provided on the display substrate 100. For example, the sensing electrode 300 may be provided on the top or the bottom of the display substrate or within the display substrate 100.

The sensing electrode 300 may be formed at a separate sensing substrate (not illustrated). Here, the sensing substrate (not illustrated) may be, for example, a PCB or a FPCB.

The sensing electrode 300 may be provided in a single layer or may be provided in multiple layers by using metal layers, bridges, or via holes.

The sensing electrode 300 may be an electrode for sensing a mutual capacitance or a self-capacitance, and may be used as a driving electrode to be described below.

The processor 400 may be electrically connected with the driving coil 200 and the sensing electrode 300 and may control the driving coil 200 and/or the sensing electrode 300. For example, the processor 400 may be configured to control a driver circuit for driving the driving coil 200 and/or a sensing circuit for sensing the sensing electrode 300. The processor 400 may be configured to implement the descriptions, functions, procedures, suggestions, methods, and/or operation flowcharts of the present disclosure.

The processor 400 is configured to apply a driving signal to the driving coil 200, to receive a response signal to the driving signal from the sensing electrode 300, and to identify a contact location of a stylus being in contact with the electronic device based on the response signal.

As described above, the electronic device according to an example of the present disclosure may include a single-layered coil, unlike an existing electro-magnetic resonance (EMR) electronic device. Accordingly, the electronic device according to an example of the present disclosure may provide the flexibility improved compared to the EMR electronic device including a two-layered coil.

Also, unlike an existing electronic device of an electrically coupled resonance (ECR) manner, the electronic device according to an example of the present disclosure may transmit a driving signal to a stylus in the form of a magnetic field.

Also, compared to an active stylus, the electronic device according to an example of the present disclosure may provide a passive driving manner in which a stylus is driven by the excitation of a magnetic field.

Below, various examples of an electronic device will be disclosed.

Below, additional description associated with the components described above will be omitted to avoid redundancy.

First Embodiment

Figure 3:
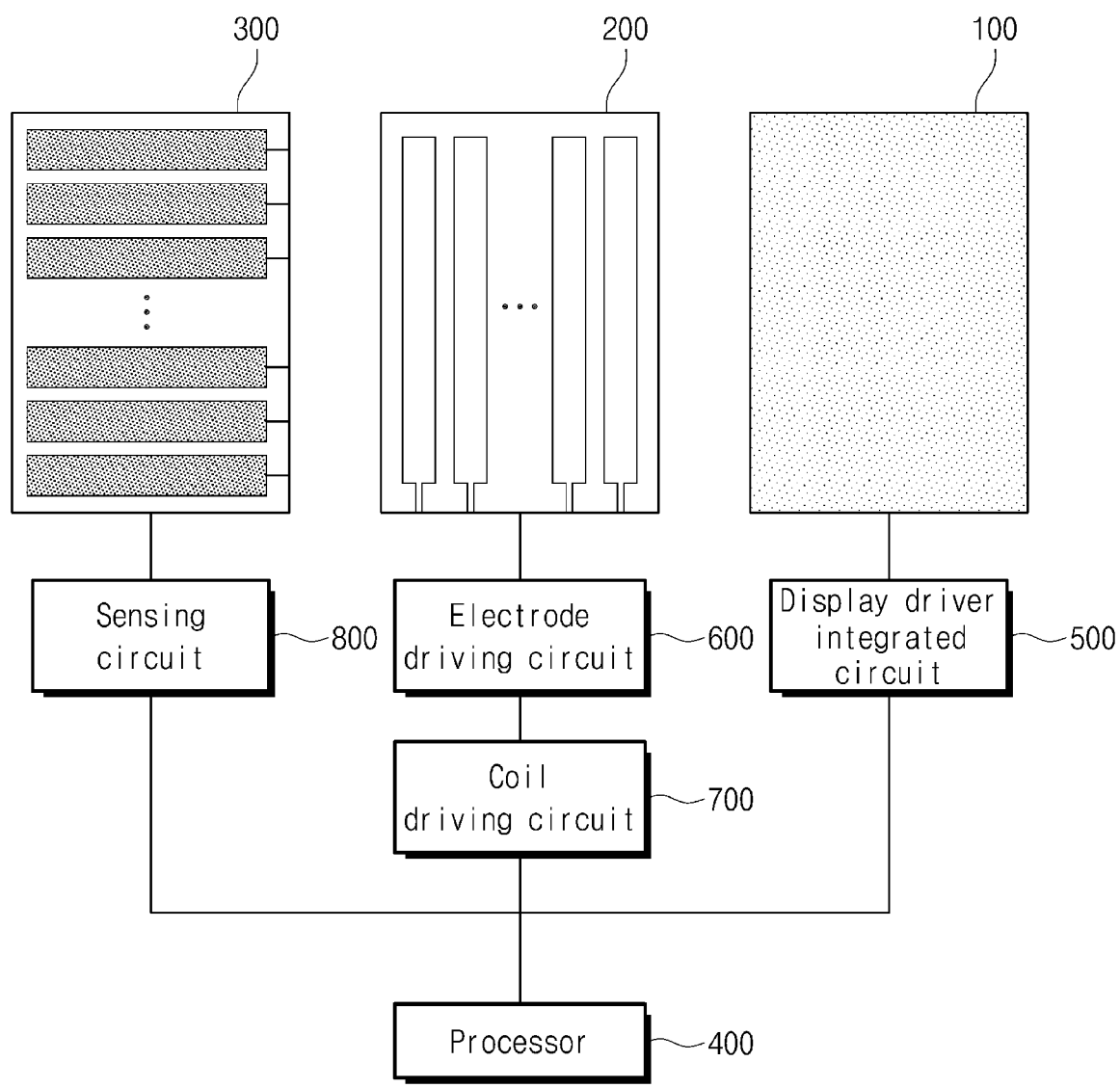
FIG. 3 is a diagram illustrating a configuration of an electronic device according to another example of the present disclosure.

FIG. 3 is a diagram illustrating a configuration of an electronic device according to another embodiment of the present disclosure.

Referring to FIG. 3, an electronic device according to a first embodiment includes the display substrate 100, the driving coil 200, the sensing electrode 300, the processor 400, a display driver integrated circuit 500, an electrode driving circuit 600, a coil driving circuit 700, and a sensing circuit 800.

In the first embodiment, the driving coil 200 may perform a role of a driving electrode together. In other words, the driving coil 200 may be used to apply a magnetic field to a stylus or may be used to apply a driving current for a self-capacitance manner or a mutual capacitance manner.

To this end, the electrode driving circuit 600 and the coil driving circuit 700 may be provided. For example, a driving current for the self-capacitance manner or the mutual capacitance manner may be applied to the driving coil 200. Alternatively, for example, the driving coil 200 may generate a magnetic field to a stylus under control of the coil driving circuit 700.

According to the first embodiment, the processor 400 may be configured to apply a driving signal to the driving coil 200 through the coil driving circuit 700 in a first mode (e.g., a digitizer mode). When the stylus contacts the display substrate 100, the processor 400 may sense a change of a capacitance of the sensing electrode 300 electrically coupled with the stylus, by using the sensing circuit 800. As such, the processor 400 may identify a point where the driving coil 200 and the sensing electrode 300 correspond to each other, as a contact location of the stylus. Also, as the contact of the stylus is sensed, the display driver integrated circuit 500 may display a text, an image, a video, or the like.

Alternatively, according to the first embodiment, the processor 400 may be configured to apply a driving signal to the driving coil 200 through the electrode driving circuit 600 in a second mode (e.g., a touch mode). When an input means (e.g., a finger of a user), not the stylus, contacts the display substrate 100, the processor 400 may sense a change of a capacitance of the sensing electrode 300 electrically coupled with the input means, by using the sensing circuit 800. As such, the processor 400 may identify a point where the driving coil 200 and the sensing electrode 300 correspond to each other, as a contact location of the input means. Also, as the contact of the input means is sensed, the display driver integrated circuit 500 may display a text, an image, a video, or the like.

Second Embodiment

Figure 4:
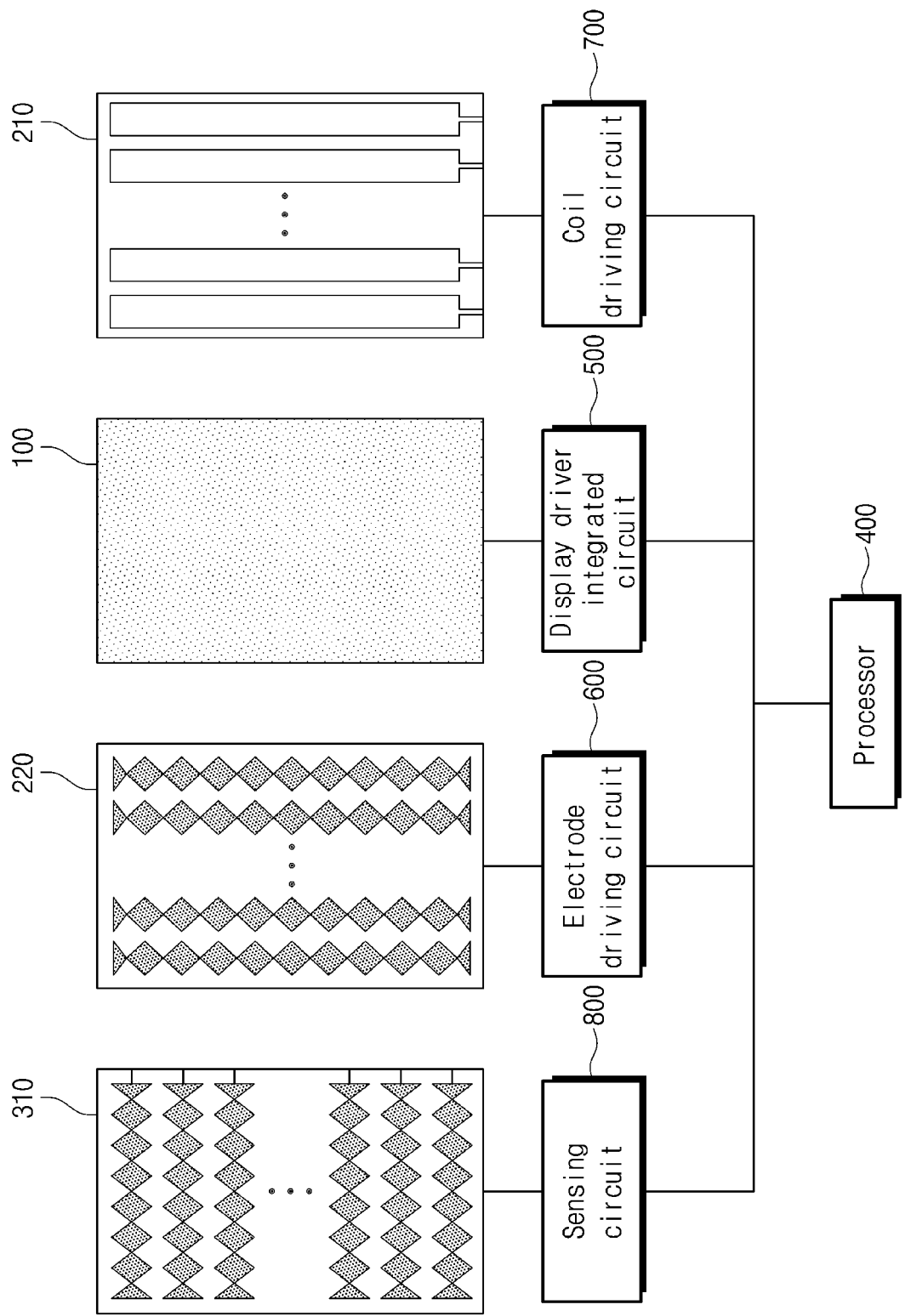
FIG. 4 is a diagram illustrating a configuration of an electronic device according to another example of the present disclosure.

FIG. 4 is a diagram illustrating a configuration of an electronic device according to another example of the present disclosure.

Referring to FIG. 4, an electronic device according to a second embodiment includes the display substrate 100, a driving coil 210, a driving electrode 220, a sensing electrode 310, the processor 400, the display driver integrated circuit 500, the electrode driving circuit 600, the coil driving circuit 700, and the sensing circuit 800.

In the second embodiment, the driving electrode 220 may be included separately from the driving coil 210.

The driving electrode 220 may be spaced and insulated from the driving coil 210 and the sensing electrode 310, and may include a plurality of driving electrodes sequentially arranged in the first direction in a plan view. Here, that the driving electrode 220 is spaced from the driving coil 210 may mean that the driving electrode 220 and the driving coil 210 are provided in different layers. The driving electrode 220 may be electrically connected with the electrode driving circuit 600 such that a driving signal for the capacitance manner is applied thereto.

The driving electrode 220 may be electrically coupled with an input means (e.g., a finger of the user), not a stylus. In this case, the sensing electrode 310 may be electrically coupled with the input means to sense a contact of the input means.

The driving electrode 220 may be provided on the display substrate 100. For example, the driving electrode 220 may be provided on the top or the bottom of the display substrate 100 or within the display substrate 100.

The driving electrode 220 may be formed at a separate driving electrode substrate (not illustrated). Here, the driving electrode substrate (not illustrated) may be, for example, a PCB or a FPCB.

The driving electrode 220 may be provided in a single layer or may be provided in multiple layers by using metal layers, bridges, or via holes.

According to the second embodiment, the processor 400 may be configured to apply a driving signal to the driving coil 210 through the coil driving circuit 700 in the first mode (e.g., a digitizer mode). When the stylus contacts the display substrate 100, the processor 400 may sense a change of a capacitance of the sensing electrode 310 electrically coupled with the stylus, by using the sensing circuit 800. As such, the processor 400 may identify a point where the driving coil 210 and the sensing electrode 310 correspond to each other, as a contact location of the stylus. Also, as the contact of the stylus is sensed, the display driver integrated circuit 500 may display a text, an image, a video, or the like.

Alternatively, according to the second embodiment, the processor 400 may be configured to apply a driving signal to the driving electrode 220 through the electrode driving circuit 600 in the second mode (e.g., a touch mode). When an input means (e.g., a finger of a user), not the stylus, contacts the display substrate 100, the processor 400 may sense a change of a capacitance of the sensing electrode 310 electrically coupled with the input means, by using the sensing circuit 800. As such, the processor 400 may identify a point where the driving electrode 220 and the sensing electrode 310 correspond to each other, as a contact location of the input means. Also, as the contact of the input means is sensed, the display driver integrated circuit 500 may display a text, an image, a video, or the like.

Third Embodiment

Figure 5:
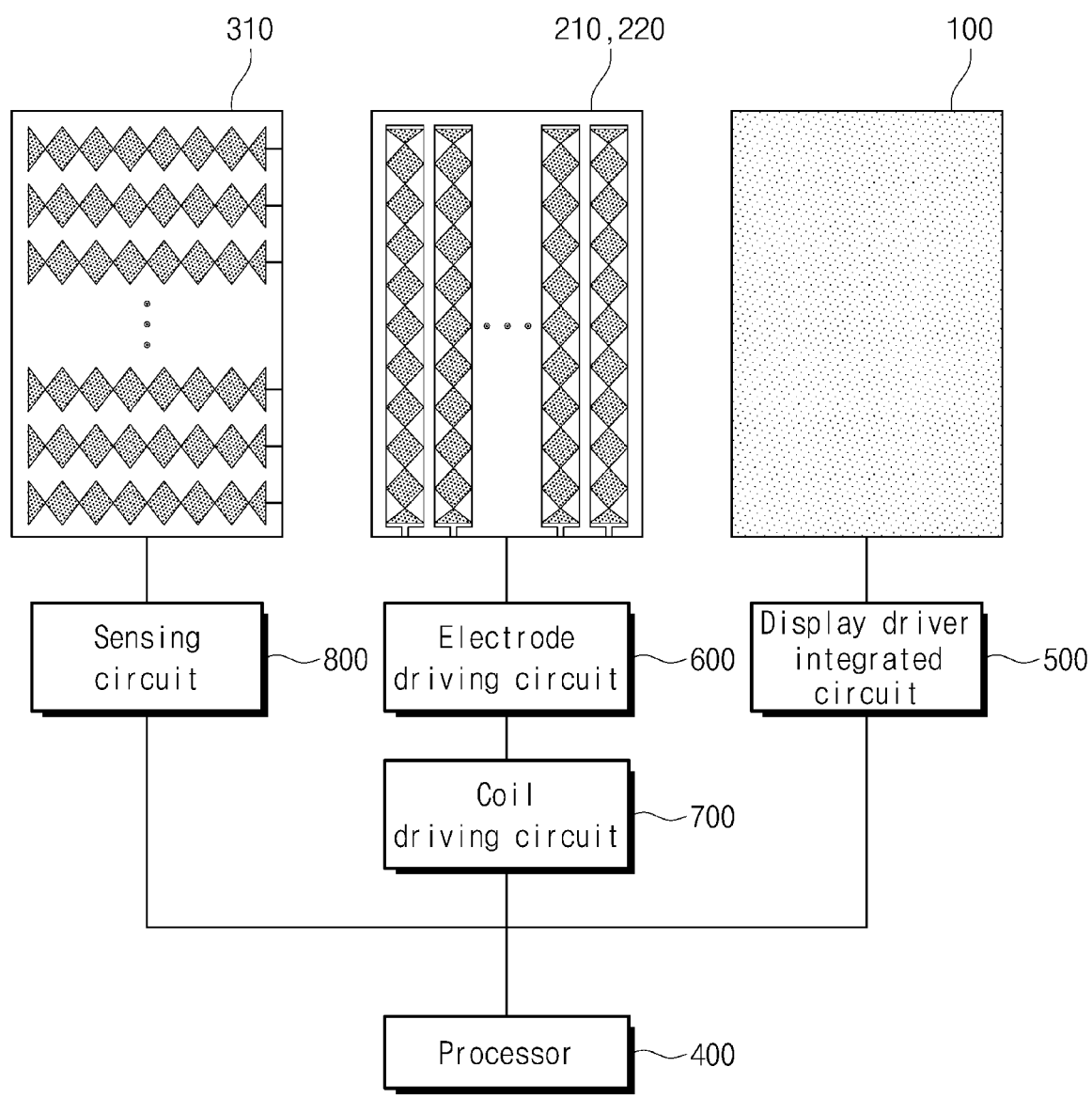
FIG. 5 is a diagram illustrating a configuration of an electronic device according to another example of the present disclosure.

FIG. 5 is a diagram illustrating a configuration of an electronic device according to another example of the present disclosure.

Referring to FIG. 5, an electronic device according to a third embodiment includes the display substrate 100, the driving coil 210, the driving electrode 220, the sensing electrode 310, the processor 400, the display driver integrated circuit 500, the electrode driving circuit 600, the coil driving circuit 700, and the sensing circuit 800.

Unlike the second embodiment, in the third embodiment, the driving electrode 220 may be provided in the same layer as the driving coil 210 in a state where the driving electrode 220 is insulated from the driving coil 210. As such, the driving electrode 220 may be provided at the same substrate (not illustrated) as the driving coil 210.

Below, a touch system including an electronic device according to various examples of the present disclosure described above will be described.

Below, additional description associated with the components described above will be omitted to avoid redundancy.

Touch System

Figure 6:
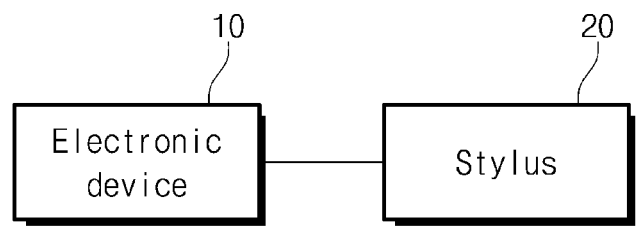
FIG. 6 is a diagram illustrating a configuration of a touch system according to an example of the present disclosure.
Figure 7A:
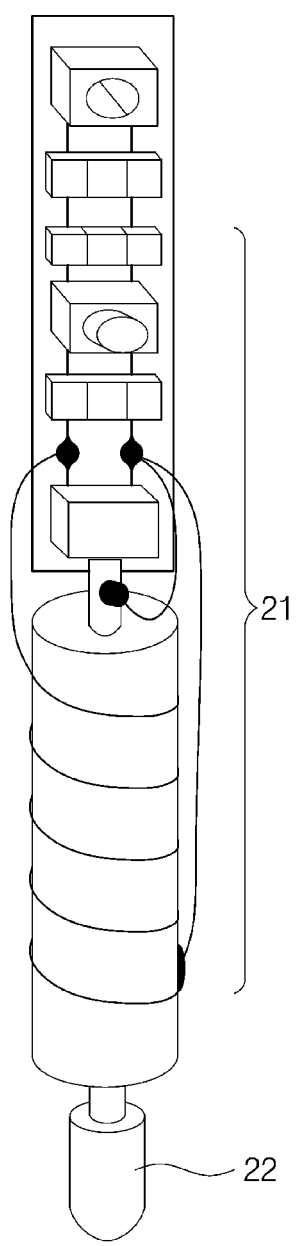
FIGS. 7A, 7B, and 7C are diagrams illustrating configurations of styluses according to various examples of the present disclosure.
Figure 7B:
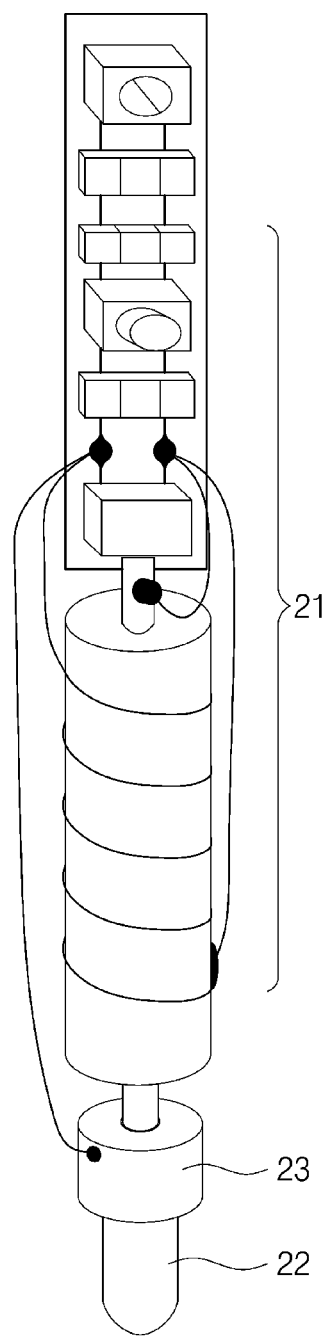
Figure 7C:
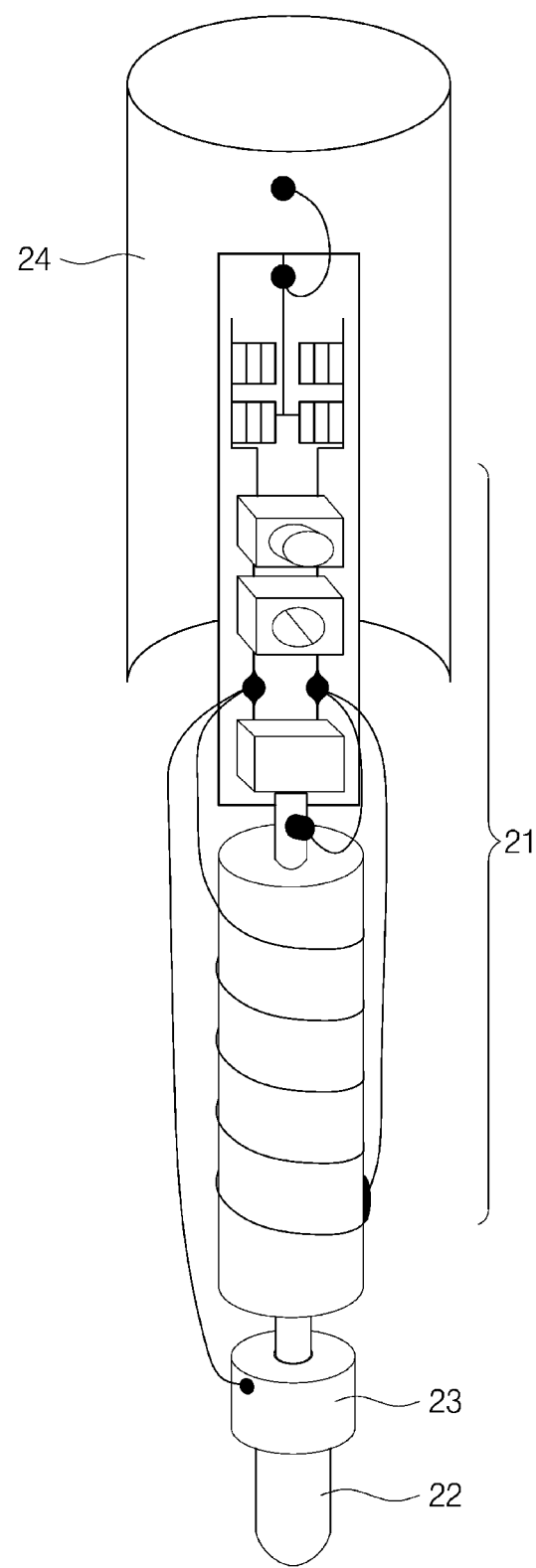

FIG. 6 is a diagram illustrating a configuration of a touch system according to an example of the present disclosure, and FIGS. 7A, 7B, and 7C are diagrams illustrating configurations of styluses according to various examples of the present disclosure.

Referring to FIG. 6, a touch system according to an example of the present disclosure includes an electronic device 10 and a stylus 20.

For example, in the electronic device 10, a driving coil may be provided on a display substrate (e.g., on the bottom of the display substrate), and a touch panel including a sensing electrode may be provided on the top of the display substrate. That is, the display substrate may be interposed between the driving coil and the sensing electrode.

Also, a cover film (not illustrated) being in contact with the stylus 20 may be provided on the touch panel. The cover film (not illustrated) may form, for example, an organic layer and/or an inorganic layer to protect the electronic device 10 from an external environment.

An order in which the components of the electronic device 10 are stacked is an example, and, as described above, the components of the electronic device 10 according to the present disclosure may be stacked in various orders.

The stylus 20 may be implemented in various shapes as illustrated in FIGS. 7A, 7B, and 7C.

For example, as illustrated in FIG. 7A, the stylus 20 includes an LC resonance unit 21 and an output unit 22.

The LC resonance unit 21 includes at least one capacitor, at least one variable capacitor, and a coil. For example, the LC resonance unit 21 may be expressed by an LC parallel equivalent circuit.

The LC resonance unit 21 may have an LC resonant frequency that is variable depending on the variable capacitor. In detail, a capacitance value of the variable capacitor may vary depending on a pressure change that occurs when the stylus 20 contacts the electronic device 10.

The LC resonance unit 21 may receive a driving signal from the electronic device 10 and may transmit a response signal to the driving signal to the electronic device 10 through the output unit 22.

For example, as illustrated in FIG. 7B, the stylus 20 may include an additional electrode 23 that is provided at the output unit 22. The additional electrode 23 may be additionally provided to sense a slope of the stylus 20.

For example, as illustrated in FIG. 7C, the stylus 20 may further include a housing 24 combined with the LC resonance unit 21.

As described above, unlike the existing EMR electronic device or the existing ECR electronic device, the touch system according to an example of the present disclosure includes a single-layered coil, transmits a driving signal to a stylus in the form of a magnetic field, and receives a signal in a capacitive coupling manner. Accordingly, the flexibility may be improved, and it may be possible to transmit a driving signal with a better signal-to-noise ratio (SNR).

Also, together with the above technical features, the electronic device according to an example of the present disclosure includes a stylus that is driven in a passive manner by the excitation of a magnetic field, and thus, the portability is improved compared to an active stylus.

Below, a driving method of an electronic device will be described.

Driving Method of Electronic Device

Figure 8:
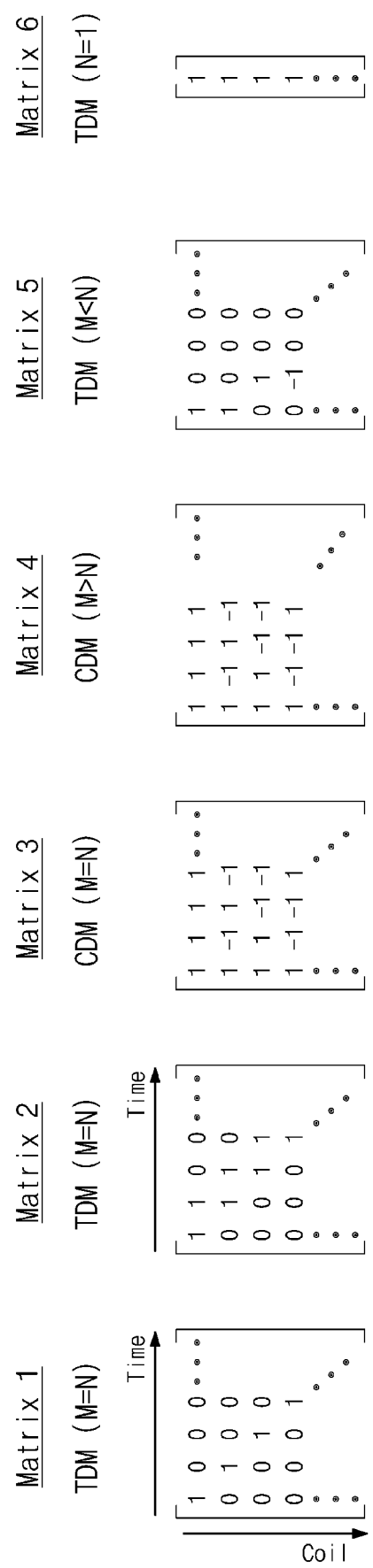
FIG. 8 illustrates various examples of a matrix for applying a driving signal.

FIG. 8 illustrates various examples of a matrix for applying a driving signal.

Referring to FIG. 8, to drive the electronic device 10 of the present disclosure, the processor 400 may be configured to apply a driving signal to a plurality of coils, based on a matrix (here, "M" indicating the number of rows and "N" indicating the number of columns) Each element of the matrix may be expressed by a phase and a magnitude of the driving signal.

The matrix may be defined in various shapes depending on a set mode (e.g., a sleep mode, an idle mode, a normal mode, or a noisy condition mode). Also, the number of driving pulses of the driving signal or a frequency of the driving signal may change depending on the set mode.

For example, referring to Matrix 1, the matrix may be defined based on time division multiplexing (TDM). Matrix 1 may be defined such that the driving signal is applied to a different coil at a different time.

Alternatively, referring to Matrix 2, the matrix may be defined based on the TDM such that there is a time at which the driving signal is simultaneously applied to at least two coils.

Alternatively, referring to Matrix 3 and Matrix 4, the matrix may be defined based on code division multiplexing (CDM). Matrix 3 and Matrix 4 may be defined such that the driving signal having various magnitudes and phases for respective times is applied for each coil. In this case, the number of rows and the number of columns may be the same or different.

Matrix 1 to Matrix 4 described above may be used in the normal mode or the noisy condition mode.

Alternatively, referring to Matrix 5, the matrix may be defined based on the TDM such that the number of rows is less than the number of columns. In this case, Matrix 5 may be defined such that the driving signal is applied to at least two coils at the same time. Matrix 5 may be used in the sleep mode.

Alternatively, referring to Matrix 6, the matrix may be defined based on the TDM such that the number of columns is "1". Matrix 6 may be used in the idle mode.

Figure 9:
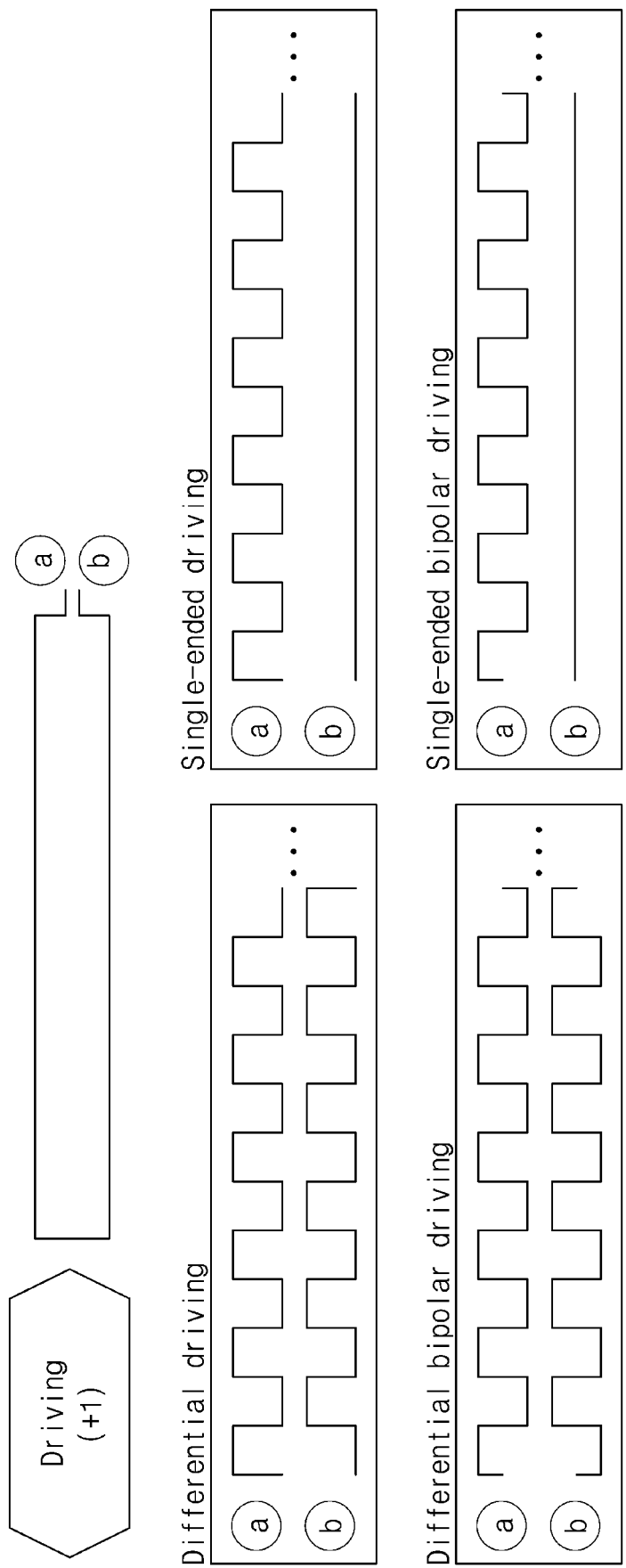
FIG. 9 illustrates various waveforms of a driving signal.

FIG. 9 illustrates various waveforms of a driving signal.

Referring to FIG. 9, a driving signal may be applied through opposite ends "a" and "b" of a driving coil.

For example, the driving signal may be applied in a differential form. That is, the driving signal may be applied such that a magnitude difference and a phase difference occur between signals respectively applied to the opposite ends of the coil.

For example, the driving signal may be applied in a signal-ended form. That is, the driving signal may be a signal that is applied to one of the opposite ends of the coil, with the other thereof grounded.

For example, the driving signal may be applied in a differential bipolar form. That is, signals in which different phases appear in turn may be applied to the opposite ends of the coil.

For example, the driving signal may be applied in a signal-ended bipolar form. That is, a signal in which different phases appear in turn may be applied to one end of the coil.

Figure 10:
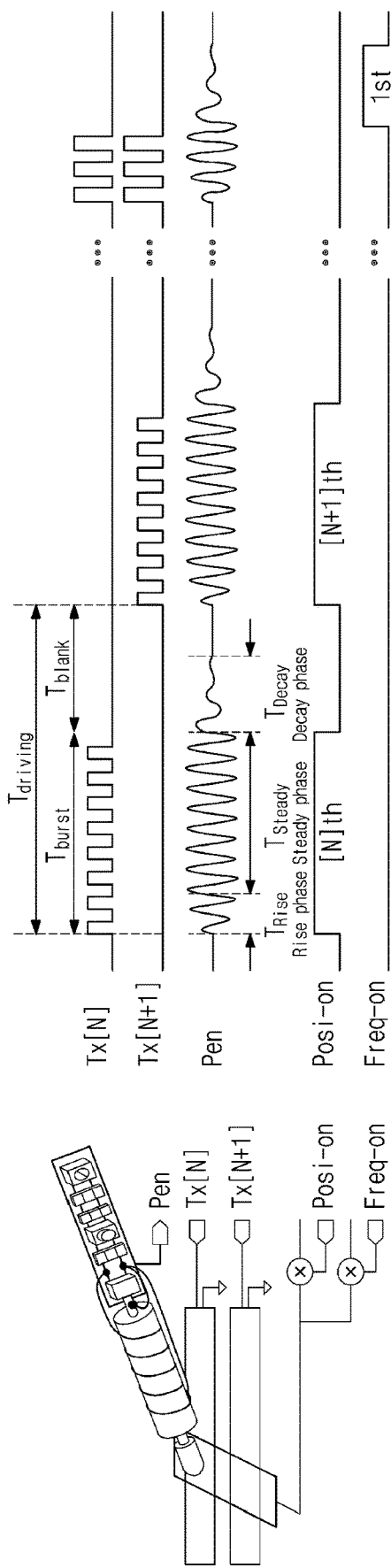
FIG. 10 is a diagram for describing driving and sensing timings of an electronic device.

FIG. 10 is a diagram for describing driving and sensing timings of the electronic device 10.

Referring to FIG. 10, a waveform timing of a response signal of a stylus when the driving signal according to the present disclosure is applied, that is, a waveform timing Tdriving of a stylus electrode may be divided into Tburst and Tblank. Also, Tburst may be divided into TRise and TSteady.

For example, Tburst may be the remaining phase of Tdriving other than Tblank, and Tblank may be a phase in which the driving signal is not applied.

For example, TRise may be a phase preceding Tsteady in Tburst, TSteady may be a steady phase where a waveform of the driving signal is maintained, TDecay may be a phase following TSteady.

According to the present disclosure, the electronic device 10 may variously select a timing, which is used for sensing, from among the above timings as follows.

Posi-on Timing

A Posi-on timing may be defined to sense a magnitude of a signal coupled to a sensing electrode for each driving coil (Tx[N], Tx[N+1], . . . ) and for each sensing electrode. The electronic device 10 may sense timings of various waveforms received from a stylus in the Posi-on timing.

FIG. 11 is a diagram for describing a Posi-on timing according to an example of the present disclosure.

Referring to FIG. 11, the processor 400 may use, for example, all the phases TRise, TSteady, and TDecay in the Posi-on timing. That is, the processor 400 may identify a contact location of the stylus 20 and/or an input means (e.g., a finger of the user) based on all the phases TRise, TSteady, and TDecay.

Alternatively, the processor 400 may use, for example, the phases TRise and TSteady in the Posi-on timing.

Alternatively, the processor 400 may use, for example, the phase TSteady in the Posi-on timing.

Alternatively, the processor 400 may use, for example, the phase TDecay in the Posi-on timing.

Freq-on Timing

The Freq-on timing may be defined to sense an LC resonant frequency of the stylus 20 from a Tblank waveform of the stylus 20. That is, the Freq-on timing may be used to sense a capacitance value of the stylus 20, which varies as a pressure of the stylus 20 changes. The electronic device 10 may sense a pressure change of the stylus 20 in the Freq-on timing.

FIG. 12 is a diagram for describing a Freq-on timing according to an example of the present disclosure.

Referring to FIG. 12, the Freq-on timing may be defined by the Tblank waveform every timing when the driving signal is applied to each driving coil. That is, the processor 400 may sense a pressure change of the stylus 20 from the Tblank waveform every timing when the driving signal is applied to each driving coil.

Alternatively, for example, when it is determined through the Posi-on timing that the stylus 20 is neighboring, the Freq-on timing may be defined by the Tblank waveform of a waveform including the corresponding Posi-on timing.

Alternatively, for example, the Freq-on timing may be defined by the Tblank waveform, which allows all or a part of driving coils to be additionally driven such that the stylus 20 is excited after all the driving coils are completely driven.

Definition of Tblank

Tblank may be defined as a positive number, "0", or a negative number.

Figure 13:
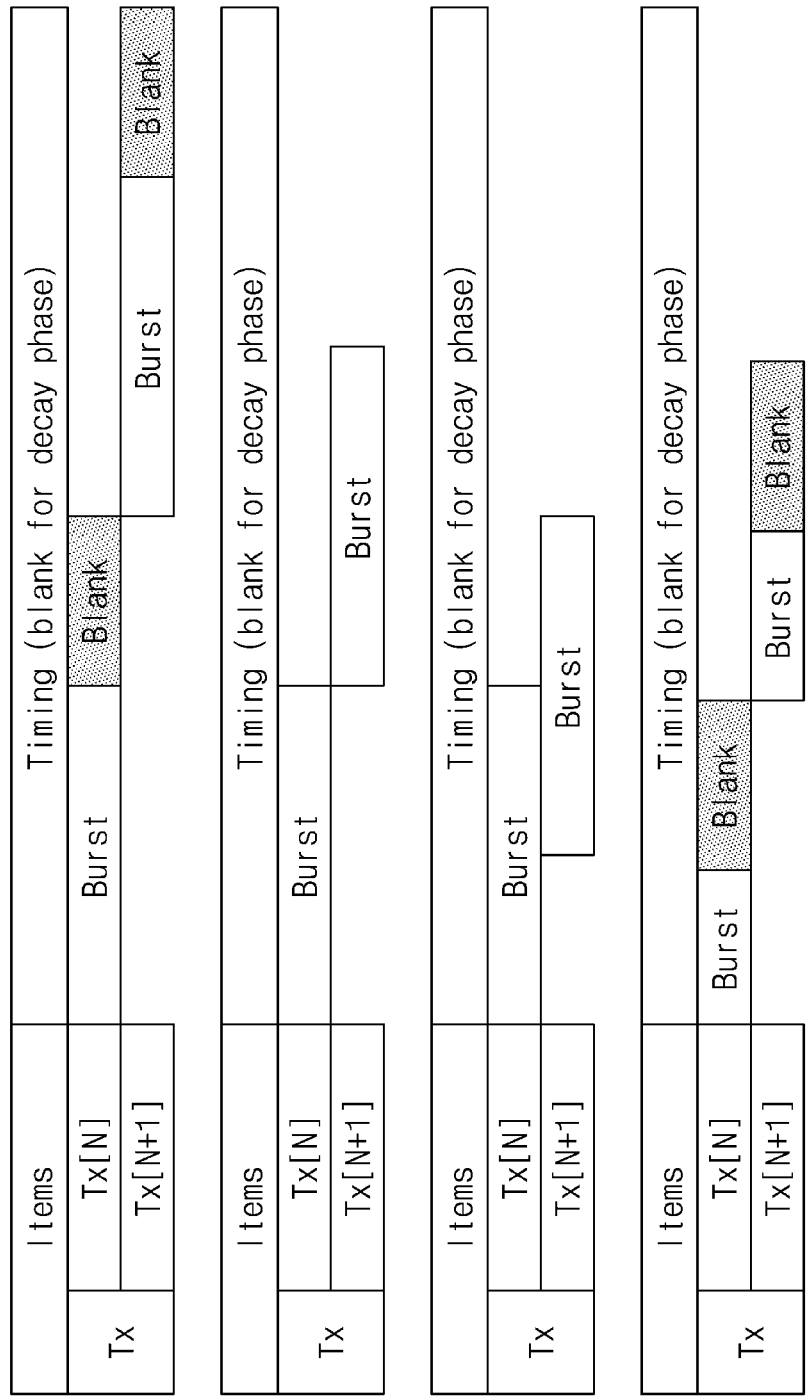
FIG. 13 is a diagram for describing various examples of Tblank according to an example of the present disclosure.

FIG. 13 is a diagram for describing various examples of Tblank according to an example of the present disclosure.

Referring to FIG. 13, in the case where Tblank is defined as a positive number, the processor 400 may apply Tburst of an (N+1)-th coil after Tblank of an N-th coil ends.

Alternatively, in the case where Tblank is defined as "0", the processor 400 may apply Tburst of the (N+1)-th coil immediately after Tblank of the N-th coil ends.

Alternatively, in the case where Tblank is defined as a negative number, the processor 400 may apply Tburst of the (N+1)-th coil during Tblank of the N-th coil. In this case, a Tburst application timing of the (N+1)-th coil may be variously set.

Alternatively, the processor 400 may apply a driving signal such that Tblank includes a time interval of the same magnitude as Trise or Tburst.

Figure 14:
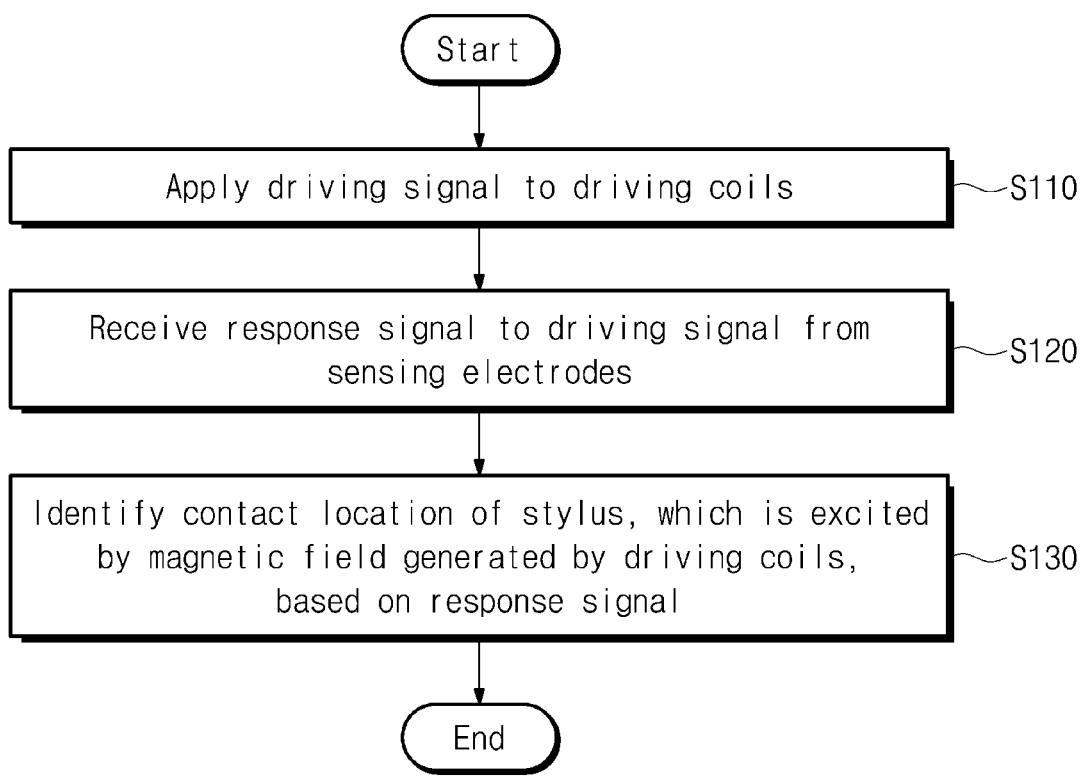
FIG. 14 is a flowchart illustrating a driving method of an electronic device according to an example of the present disclosure.

FIG. 14 is a flowchart illustrating a driving method of the electronic device 10 according to an example of the present disclosure.

Referring to FIG. 14, in operation S110, the processor 400 applies a driving signal to a plurality of driving coils. The driving signal may be, for example, a pulse wave and may be applied in various forms as described above. Also, the driving signal may be applied at a different time for each of the plurality of driving coils.

In operation S120, the processor 400 receives a response signal to the driving signal from a plurality of sensing electrodes.

In operation 130, the processor 400 identifies a contact location of the stylus 20, which is excited by a magnetic field generated by the plurality of driving coils, based on the response signal. In this case, the response signal may be received based on that at least one of the plurality of sensing electrodes is electrically coupled with the stylus 20.

For example, in the case where the driving signal is applied at a different time, the processor 400 may identify at least one of a plurality of points at which at least one of the plurality of sensing electrodes corresponds to the plurality of driving coils, as a contact location, based on the different time.

For example, the processor 400 may identify a contact location during a first timing of an interval where the response signal is received. In this case, the first timing may include the above phases TRise and TSteady (i.e., a time interval from when the response signal is received to when a steady state of the response signal ends).

For example, the processor 400 may further identify a resonant frequency of the stylus 20 during a second timing, which follows the first timing and belongs to the interval where the response signal is received, after operation S130. In this case, the second timing may include the above phase Tblank.

According to various examples of the present disclosure, there are effects as follows.

According to various examples of the present disclosure, because a single-layered coil is included, an electronic device having the flexibility improved compared to an existing digitizer, a touch system including the electronic device, and an operating method thereof may be provided.

Also, the portability of the stylus may be improved while maintaining a passive characteristic of the stylus for driving of the electronic device and the driving method thereof.

The effects that are achieved through various examples of the present disclosure may not be limited to what has been particularly described herein, and other effects not described herein may be more clearly understood from the following detailed description by one skilled in the art.

It is obvious that examples of the proposed method described above may also be included as one of the implementation methods of the present disclosure, and thus may be regarded as a kind of proposed methods. Further, the proposed schemes described above may be implemented independently of each other, but may also be implemented as a combination (or merging) of some of the proposed schemes.

Examples of the present disclosure described above are provided to allow one skilled in the art to implement and carry out the examples of the present disclosure. The description is given above with reference to examples of the present disclosure, but one skilled in the art could variously change or modify the examples of the present disclosure. Accordingly, the present disclosure will intend to maximally grant the scope coinciding with principles and novel features disclosed herein, not limiting the present disclosure to examples disclosed herein.

What is claimed is:

1. An electronic device comprising:
a plurality of driving coils sequentially arranged in a first direction in a plan view;
a display substrate comprising a display area disposed on a first layer above the plurality of driving coils;
a plurality of sensing electrodes spaced apart and insulated from the plurality of driving coils, sequentially arranged in a second direction orthogonal to the first direction in the plan view, and disposed on a second layer above the first layer;
a plurality of driving electrodes sequentially arranged in the first direction in the plan view, provided on a same layer as the plurality of driving coils, and insulated from the plurality of driving coils and the plurality of sensing electrodes; and
a processor electrically connected with the plurality of driving coils and the plurality of sensing electrodes,
wherein at least one of the plurality of sensing electrodes is electrically coupled with a stylus excited by a magnetic field generated by the plurality of driving coils, and
wherein the processor is configured to:
apply a driving signal to the plurality of driving coils;
receive a response signal to the driving signal from the plurality of sensing electrodes;
identify a contact location of the stylus based on the response signal;
identify the contact location during a first timing of an interval where the response signal is received; and
identify a resonant frequency of the stylus during a second timing following the first timing and belonging to the interval,
wherein at least one of the plurality of driving coils generates the magnetic field in the stylus based on the driving signal,
wherein at least one of the plurality of sensing electrodes is capacitively coupled with the stylus,
wherein a waveform timing of the response signal includes a blank timing in which the driving signal is not applied and a burst timing excluding the blank timing, and
wherein the second timing is defined as the blank timing based on additionally driving of at least one driving coil among the plurality of driving coils after the plurality of driving coils are driven.

2. The electronic device of claim 1, further comprising:
a cover film located on the plurality of sensing electrodes to be in contact with the stylus.

3. The electronic device of claim 1, wherein at least one of the plurality of driving electrodes is electrically coupled with not the stylus but an input means, and
wherein at least one of the plurality of driving electrodes is electrically coupled with the input means.

4. The electronic device of claim 1, wherein each of the plurality of driving coils includes at least one turn.

5. The electronic device of claim 1, wherein the processor is configured to:
apply the driving signal at a different time; and
identify at least one of a plurality of points at which at least one of the plurality of sensing electrodes corresponds to the plurality of driving coils, as the contact location, based on the different time.

6. The electronic device of claim 1, wherein the first timing is a time interval from when the response signal is received to when a steady state of the response signal ends.

7. A touch system comprising:
a stylus; and
an electronic device configured to identify a contact location of the stylus,
wherein the electronic device includes:
a plurality of driving coils sequentially arranged in a first direction in a plan view;
a display substrate comprising a display area disposed on a first layer above the plurality of driving coils;
a plurality of sensing electrodes spaced apart and insulated from the plurality of driving coils, sequentially arranged in a second direction orthogonal to the first direction in the plan view, and disposed on a second layer above the first layer;
a plurality of driving electrodes sequentially arranged in the first direction in the plan view, provided on a same layer as the plurality of driving coils, and insulated from the plurality of driving coils and the plurality of sensing electrodes; and
a processor electrically connected with the plurality of driving coils and the plurality of sensing electrodes, and
wherein the stylus is excited by a magnetic field generated by the plurality of driving coils,
wherein at least one of the plurality of sensing electrodes is electrically coupled with the stylus, and
wherein the processor is configured to:
apply a driving signal to the plurality of driving coils;
receive a response signal to the driving signal from the plurality of sensing electrodes;

identify the contact location of the stylus based on the response signal;
identify the contact location during a first timing of an interval where the response signal is received; and
identify a resonant frequency of the stylus during a second timing following the first timing and belonging to the interval,
wherein at least one of the plurality of driving coils generates the magnetic field in the stylus based on the driving signal,
wherein at least one of the plurality of sensing electrodes is capacitively coupled with the stylus,
wherein a waveform timing of the response signal includes a blank timing in which the driving signal is not applied and a burst timing excluding the blank timing, and
wherein the second timing is defined as the blank timing based on additionally driving of at least one driving coil among the plurality of driving coils after the plurality of driving coils are driven.

8. The touch system of claim 7, wherein the plurality of sensing electrodes are located on the plurality of driving coils.

9. The touch system of claim 8, wherein the electronic device further includes a cover film located on the plurality of sensing electrodes to be in contact with the stylus.

10. The touch system of claim 7,
wherein at least one of the plurality of driving electrodes is electrically coupled with not the stylus but an input means, and
wherein at least one of the plurality of driving electrodes is electrically coupled with the input means.

11. The touch system of claim 7, wherein the processor is configured to:
apply the driving signal at a different time for each of the plurality of driving coils; and
identify at least one of a plurality of points at which at least one of the plurality of sensing electrodes corresponds to the plurality of driving coils, as a contact location, based on the different time.

12. The touch system of claim 11, wherein the first timing is a time interval from when the response signal is received to when a steady state of the response signal ends.

13. A method, which is performed by an electronic device comprising:
a plurality of driving coils sequentially arranged in a first direction in a plan view;
a display substrate comprising a display area disposed on a first layer above the plurality of driving coils;
a plurality of sensing electrodes spaced apart and insulated from the plurality of driving coils, sequentially arranged in a second direction orthogonal to the first direction in the plan view, and disposed on a second layer above the first layer;
a plurality of driving electrodes sequentially arranged in the first direction in the plan view, provided on a same layer as the plurality of driving coils, and insulated from the plurality of driving coils and the plurality of sensing electrodes; and
a processor electrically connected with the plurality of driving coils and the plurality of sensing electrodes,
wherein the method comprises:
applying, by the processor, a driving signal to the plurality of driving coils;
receiving, by the processor, a response signal to the driving signal from the plurality of sensing electrodes;
identifying, by the processor, a contact location of a stylus, which is excited by a magnetic field generated by the plurality of driving coils, based on the response signal,
identifying, by the processor, the contact location during a first timing of an interval where the response signal is received; and
identifying, by the processor, a resonant frequency of the stylus during a second timing following the first timing and belonging to the interval,
wherein at least one of the plurality of driving coils generates the magnetic field in the stylus based on the driving signal,
wherein at least one of the plurality of sensing electrodes is capacitively coupled with the stylus,
wherein a waveform timing of the response signal includes a blank timing in which the driving signal is not applied and a burst timing excluding the blank timing, and
wherein the second timing is defined as the blank timing based on additionally driving of at least one driving coil among the plurality of driving coils after the plurality of driving coils are driven, and
wherein the response signal is received based on that at least one of the plurality of sensing electrodes is electrically coupled with the stylus.

14. The method of claim 13, wherein the driving signal is applied at a different time for each of the plurality of driving coils, and
wherein at least one of a plurality of points at which at least one of the plurality of sensing electrodes corresponds to the plurality of driving coils is identified as the contact location, based on the different time.

* * * * *